US012782553B2

(12) United States Patent
Tenselius et al.

(10) Patent No.: US 12,782,553 B2
(45) Date of Patent: Nov. 3, 2026

(54) MULTI-MODALITY CORNER VEHICLE SENSOR MODULE

(71) Applicant: Scania CV AB, Södertälje (SE)

(72) Inventors: Daniel Tenselius, Trosa (SE); Fredrich Claezon, Värmdö (SE); Mattias Johansson, Stockholm (SE); Erik Johansson, Trosa (SE)

(73) Assignee: Scania CV AB, Södertälje (SE)

( * ) Notice: Subject to any disclaimer, the term of this patent is extended or adjusted under 35 U.S.C. 154(b) by 185 days.

(21) Appl. No.: 18/035,354

(22) PCT Filed: Nov. 2, 2021

(86) PCT No.: PCT/SE2021/051093
§ 371 (c)(1),
(2) Date: May 4, 2023

(87) PCT Pub. No.: WO2022/103314
PCT Pub. Date: May 19, 2022

(65) Prior Publication Data

US 2024/0012136 A1 Jan. 11, 2024

(30) Foreign Application Priority Data

Nov. 10, 2020 (SE) .................................... 2051313-1

(51) Int. Cl.
*G01S 13/931* (2020.01)
*B60R 11/00* (2006.01)
*G01S 13/87* (2006.01)

(52) U.S. Cl.
CPC ............ *G01S 13/931* (2013.01); *B60R 11/00* (2013.01); *G01S 13/87* (2013.01);
(Continued)

(58) Field of Classification Search
CPC ................... G01S 13/931; G01S 13/87; G01S 2013/9327; B60R 11/00; B60R 2011/004; B60R 2011/0082
See application file for complete search history.

(56) References Cited

U.S. PATENT DOCUMENTS 6,508,325 B1 1/2003 Schwarz et al.
10,089,538 B2 * 10/2018 Molin ....................... G06T 7/73
(Continued)

FOREIGN PATENT DOCUMENTS

CN 109923491 A 6/2019
DE 102005056800 A1 5/2007
(Continued)

OTHER PUBLICATIONS

Jan. 14, 2022—(WO) International Search Report & Written Opinion—App. No. PCT/SE2021/051093.
(Continued)

*Primary Examiner* — Nazra Nur Waheed
(74) *Attorney, Agent, or Firm* — Banner & Witcoff, Ltd.

(57) ABSTRACT

The present disclosure relates to corner-mounted sensor modules for vehicles containing a multitude of sensor systems based on different types of sensors. In particular, the disclosure relates to a vehicle comprising a first and a second sensor module. The first and a second sensor modules each comprises a rigid structure, one or more first sensors of a first sensor type, one or more second sensors of a second type and an attachment mechanism. A sum of the field of views of the first and second sensor modules is at least 540 degrees. Furthermore, one of the sensor modules is arranged at a front corner of the vehicle and the other sensor module is arranged at a rear corner at the opposite side of the vehicle such that a composed field of view of the two sensor modules covers 360 degrees in relation to a reference point at the vehicle.

20 Claims, 4 Drawing Sheets

(52) U.S. Cl.
CPC . *B60R 2011/004* (2013.01); *B60R 2011/0082* (2013.01); *G01S 2013/9327* (2020.01)

(56) References Cited

U.S. PATENT DOCUMENTS

| | | | | |
|---|---|---|---|---|
| 11,242,098 | B2 * | 2/2022 | Patnaik | B60W 30/18009 |
| 2016/0243988 | A1 * | 8/2016 | Peterson | B60R 1/0617 |
| 2016/0300113 | A1 | 10/2016 | Molin et al. | |
| 2017/0315231 | A1 | 11/2017 | Wodrich | |
| 2019/0204845 | A1 | 7/2019 | Grossman et al. | |
| 2019/0220034 | A1 | 7/2019 | Balogh et al. | |
| 2019/0293756 | A1 | 9/2019 | Blaes et al. | |
| 2020/0039531 | A1 | 2/2020 | Fushimi et al. | |
| 2020/0150267 | A1 | 5/2020 | Wodrich | |
| 2020/0236338 | A1 | 7/2020 | Mitani et al. | |
| 2021/0197810 | A1 * | 7/2021 | LeBeau | B60W 30/09 |
| 2021/0339685 | A1 * | 11/2021 | Adams | B60R 11/04 |

FOREIGN PATENT DOCUMENTS

| | | | |
|---|---|---|---|
| EP | 3605136 | A1 | 2/2020 |
| JP | 2018144544 | A | 9/2018 |
| WO | 2019065218 | A1 | 4/2019 |
| WO | 2019215350 | A1 | 11/2019 |

OTHER PUBLICATIONS

Apr. 20, 2020—(SE) Search Report—App. No. 2051313-1.

Dec. 13, 2025—(CN) First Office Action—App. No. 202180071721.X.

May 12, 2026—(BR) First Office Action. App. No. BR112023007898-9.

* cited by examiner

MULTI-MODALITY CORNER VEHICLE SENSOR MODULE

CROSS-REFERENCE TO RELATED APPLICATIONS

The present application claims priority from and is a U.S. National Phase of International Application No. PCT/SE2021/051093, which was filed on Nov. 2, 2021, designating the United States of America and claiming priority to Swedish Patent Application No. 2051313-1, filed on Nov. 10, 2020. This application claims priority to and the benefit of the above-identified applications, which are all fully incorporated by reference herein in their entireties.

TECHNICAL FIELD

The present disclosure relates to corner-mounted sensor modules for vehicles comprising a multitude of sensor systems based on different types of sensors. In particular, the disclosure relates to a vehicle comprising two corner-mounted sensor modules.

BACKGROUND

An autonomous vehicle will need an extensive sensor architecture to provide 360 degrees of world perception and be able to handle all possible scenarios without human intervention. In addition, the sensor architecture needs to fulfil certain redundancy requirements if there is a failure in one or more sensors. Hence, a plurality of discrete sensor systems including substantial number of separate sensors of different types is typically required.

The amount of separate sensor systems brings complexity in many areas. For example, a multitude of installation positions for different types of sensors may lead to a complex analysis for field of view coverage and related tolerances. Furthermore, all the individual sensors of the discrete sensor systems need mounting points at the vehicle. All these mounting points require significant design efforts for evaluating mechanical simulations, thermal aspects, and legal requirements. In addition, the different sensor systems need individual cabling, for both power and communication interfaces. In fact, the needs for cable routing for all sensor systems may be significant, and usually scales with the number of installed sensor systems.

It must also be appreciated that due to the many different shapes of commercial vehicles the same sensor layout may not be feasible on different vehicle variants, which makes design and manufacturing even more complex and cumbersome.

Another aspect related to the sensor systems is calibration, as every sensor system typically needs a unique calibration for the actual precise location on the vehicle. In particular, calibration of the full vehicle with all sensor systems is complex, and the complexity scales with the number of installed sensors. Furthermore, the relative calibration between sensor systems is fragile due to the amount of unique mounting points and the distances between sensors. Due to the size of a heavy vehicle significant relative movement can occur which can invalidate the calibration and cause performance reduction or loss of functionality.

To solve the above identified needs several solutions have been proposed. For example, US20170315231 discloses a sensing system of a vehicle which includes a control and a mounting carrier that supports a plurality of sensor units. The mounting carrier is configured to be disposed at the vehicle so that the plurality of sensor units having respective fields of sensing exterior of the vehicle.

However, to address needs related to vehicles with multiple sensor systems for use for example in autonomous driving, there is a need for improved sensor arrangements that facilitates coverage, design, manufacturing, and calibration.

SUMMARY

It is an object of the disclosure to alleviate at least some of the drawbacks with the prior art. Thus, it is an object of this disclosure to provide a sensor arrangement that facilitates design, manufacturing, and installation. It is a further objective to provide a sensor arrangement that provides a simplified way to achieve 360 degrees coverage with sufficient redundancy. Furthermore, it is an objective to provide one single sensor layout, which is valid for many different vehicle variants, including trucks and buses.

To meet these objectives, this disclosure proposes various techniques where sensor modules comprising different types of sensors and mounted at pre-defined installation points at the vehicle body. More specifically, sensor modules are mounted at two or more corners of the vehicle to provide 360 degrees of world perception.

The disclosure relates to a vehicle comprising a first and a second sensor module. The first and a second sensor modules each comprises a rigid structure, one or more first sensors of a first sensor type, one or more second sensors of a second sensor type and an attachment mechanism. The one or more first sensors are rigidly mounted at the rigid structure such that they provide a first composed horizontal field of view around the sensor module. The one or more second sensors are rigidly mounted at the rigid structure such that they provide a second composed horizontal field of view around the sensor module. A field of view of one sensor module is composed by the first and the second composed horizontal field of views of the sensor module. Furthermore, a sum of the field of views of the first and second sensor modules is at least 540 degrees. The attachment mechanism is configured to attach the rigid structure at the vehicle. One of the sensor modules is arranged at a front corner of the vehicle and the other sensor module is arranged at a rear corner at the opposite side of the vehicle such that a composed field of view of the two sensor modules covers 360 degrees in relation to a reference point at the vehicle. By arranging the sensor modules at two corners in this way, 360 degrees of world perception around the vehicle can be provided with only two sensors. Thereby, there is an improved possibility to share cables for interface and power. Also, easy access for maintenance and replacement is provided. The modularity also makes it possible for the sensors of different types to share cleaning and heat management solutions.

In some embodiments, the field of view of one sensor module is an overlapping field of view covered by both the first composed horizontal field of view and the second composed horizontal field of view. Thereby, the sensor module can provide 360 degrees coverage for each sensor type.

In some embodiments, the field of view is, for each individual sensor module, between 240 and 300 degrees or between 260 and 280 degrees. Hence, the solution can be implemented on vehicles having different shapes (e.g. differently shaped corners) and still 360 degrees of world perception around the vehicle can be provided with both sensor types.

In some embodiments, the vehicle comprises two long sides and two short sides and the attachment mechanism is arranged to position the first and second sensor modules at least partly outside an occlusion zone limited by extension lines of the long sides and the short sides. Thereby, free sight is obtained around the entire corner.

In some embodiments, the attachment mechanism is arranged to position the first and second sensor modules such that they have free sight around a corner of the vehicle at which the sensor module is mounted. In this way, complete world perception around the vehicle is achieved.

In some embodiments, the vehicle comprises a third sensor which is the same kind as the first and second sensors and mounted in the same way, but arranged at another corner of the vehicle such that a field of view of the third sensor module is overlapping the field of views of the first and second sensor modules. In other words, one or more additional sensor modules may be added to fulfil redundancy requirements.

In some embodiments, the one or more first sensors are mounted such that the one or more first sensors and the one or more second sensors of one sensor module have a common viewing angle that originate from a common axis. Thereby, sensor fusion is facilitated.

In some embodiments, the one or more first sensors and the one or more second sensors are rigidly mounted at predefined positions at the rigid structure with pre-defined accuracy. Rigid mounting implies lower calibration needs of the vehicle as the relative placement of sensor within a sensor module can be pre-calibrated. The higher rigidity the better precision may be achieved in relative pre-calibration of the sensors within a sensor module. This simplifies integration of the sensors on different vehicle variants. Also, the rigid design allows for good thermal and long-term characteristics, meaning the relative calibration will stay valid for a long time and cope well with external stress from vibration and shock. In addition, through the use of low tolerance manufacturing methods and rigid materials such as aluminium or similar, high precision can be reached for the relative positioning of the different sensors.

In some embodiments, the first and second sensors are mounted to the rigid structure in a rotation symmetric manner in a horizontal plane. With this mounting a symmetric view around the vehicle corner is provided.

In some embodiments, the distance between the first and second sensors within a sensor module is a fraction of a distance between two sensor modules. By positioning the sensors in close proximity, the sensors may share cabling and other sensor management solutions.

In some embodiments, the at least two sensor modules comprise a transparent cover arranged to cover the field of views of the first and second sensors. Thereby, one cleaning solution may be used for all the sensors of one module.

In some embodiments, the one or more first sensors are mounted such that it is positioned at least partly on top of the one or more second sensors. Thereby, a compact design may be achieved.

In some embodiments, the first and second sensor types comprises one or more of image sensors, a radar and a lidar. Hence, sensors using different sensor technologies may be fitted into one single sensor module.

In some embodiments, the attachment mechanism comprises a collapsible member arranged to position the sensor module in a retracted position inside the occlusion zone or in a protracted position outside the occlusion zone. Thereby, the sensor module may be protected while not in use.

DETAILED DESCRIPTION

This disclosure proposes a vehicle comprising corner-mounted sensor modules. The sensor modules comprise a rigid structure designed to hold sensors of different sensor systems in close proximity. A diagonal installation concept in the corners of the vehicle enables 360 degrees view with each sensor system using just two of the four corners. Furthermore, each of the corner sensor modules have a single well-defined attachment point at the vehicle, which simplifies installation on different vehicle variants.

In the following disclosure, embodiments of a vehicle comprising corner mounted sensor modules will be explained with reference to the FIGS. 1 to 5.

Figure 1:
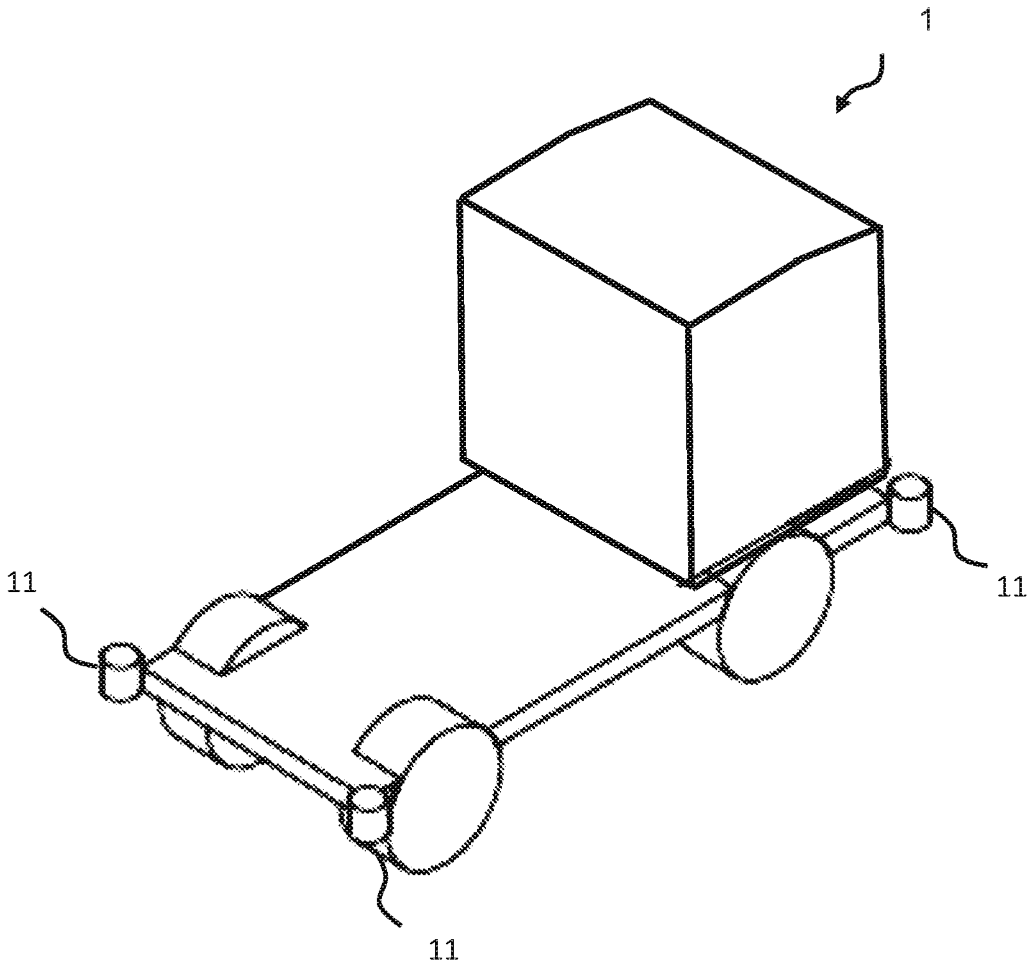
FIG. 1 illustrates a vehicle comprising a plurality of sensor modules.

FIG. 1 conceptually illustrates a vehicle 1, here a truck, where the proposed technique may be implemented. The proposed technique is applicable to any vehicle implementing any type of perception for autonomous operation. Note that autonomous operation is herein not limited to fully autonomous operation, but also includes autonomous functions such as lane keeping and parking assistance.

The vehicle 1 comprises equipment required for autonomous driving, such as an autonomous driving system, a navigation system, sensors, actuators etc. The autonomous driving system is configured to operate the vehicle autonomously. The sensors and meters are configured to provide vehicle parameters for use by the autonomous driving system. The navigation system is configured to determine a curvature of an upcoming road. For simplicity, only parts of the vehicle 1 that are related to the proposed technique are illustrated in FIG. 1 and described herein.

The vehicle 1 illustrated in FIG. 1 comprises one sensor module 11 in each corner. The sensor modules 11 are configured for use in autonomous operation of the vehicle 1 and are sometimes referred to as an autonomy sensor suite. The autonomous sensors play an essential role in automated driving. For example, the autonomy sensor suite allows the vehicle to monitor its surroundings, detect oncoming obstacles, and safely plan its paths. In other words, the sensor modules 11 are configured for use in autonomous driving. For example, the sensor modules 11 are configured for use in object detection, ego-vehicle localisation or odometry during autonomous operation. In other words, the sensor modules 11 are for use in perceiving the vehicle's own position and movement as well as its surroundings during autonomous driving. The sensor modules 11 may comprise, but are not limited to, lidars or radars (suitable for distance measurements) and image sensors (suitable for angular measurements). For accurate use of the sensor modules 11, the poses (orientation and position) of the sensor modules 11 in the vehicle coordinate frame needs to be known. The vehicle coordinate frame is typically defined in relation to a reference point of the vehicle, such as the centre of the rear wheel axle.

The vehicle 1 illustrated in FIG. 1 comprises four sensor modules (one is not visible in FIG. 1). However, with the proposed solution only two sensor modules are required to see 360 degrees around the vehicle 1, which will now be explained. In other words, this disclosure proposes a vehicle 1 comprising at least a first and a second sensor module 11.

Figure 2:
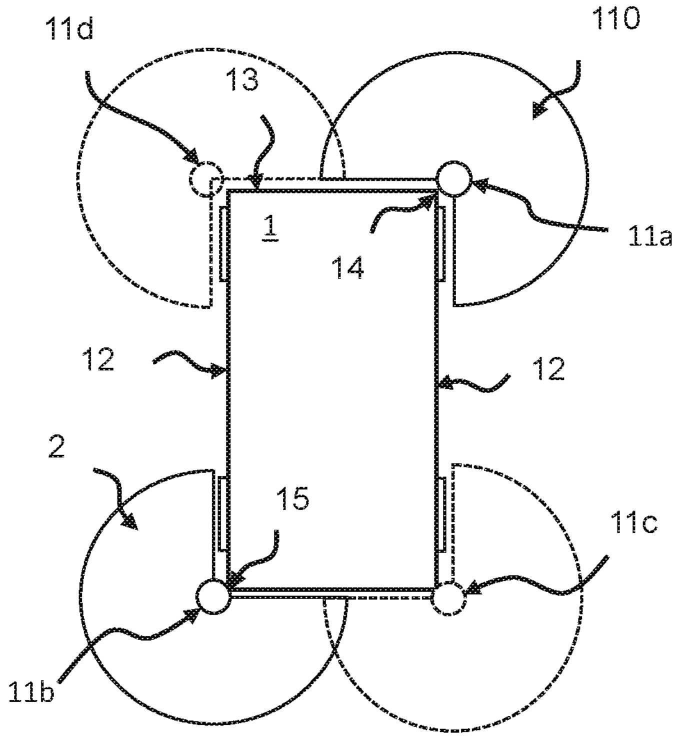
FIG. 2 illustrates a vehicle comprising sensor modules seen from above.

The concept will now first be described with reference to FIG. 2. FIG. 2 illustrates the vehicle 1 seen from above. The vehicle comprises a first and second corner mounted sensor module 11 (denoted 11*a*, 11*b*). A third and a fourth sensor module 11*c*, 11*d* are illustrated with dashed lines, as those are optional for achieving 360 degrees world perception. The vehicle of FIG. 2 comprises two long sides 12 (or simply sides) and two short sides 13. The sensor modules 11*a*, 11*b* are mounted on opposite long sides 12 of the vehicle 1, one at a front corner 14 and one at a back corner 15. In other words, one of the sensor modules 11 (in FIG. 2 denoted 11*a*) is arranged at a front corner 14 of the vehicle 1 and another sensor module 11 (in FIG. 2 denoted 11*b* is arranged at a rear corner 15 at the opposite side 12 of the vehicle 1. In other words, the sensor modules 11 are diagonally installed on two corners of the vehicle body.

In the example of FIG. 2, all corners of the vehicle 1 are perpendicular (seen from above). In these embodiments, the first sensor modules 11*a* and the second sensor module 11*b* both have a horizontal field of view 110 (herein also referred to as simply field of view) of at least 270 degrees. Consequently, the sum of the (horizontal) field of views 110 of the first sensor module 11*a* and the second sensor module 11*b* is then at least 540 degrees. From FIG. 2 it is evident that this setting provides full visibility around the vehicle 1. In other words, the field of views of the two sensor modules 11*a*, 11*b* together cover 360 degrees in relation to a reference point at the vehicle 1. Stated differently, a composed field of view of the two sensor modules 11*a*, 11*b* covers 360 degrees in relation to a reference point at the vehicle 1. The reference point is for example the centre of the back axle or a geometric centre (origin) of the vehicle body.

However, depending on the shape of the vehicle body the required field of views of the individual sensor modules 11 may vary slightly as obstruction by the vehicle body may differ. For example, if the front corners are 85 degrees and the rear corners are 95 degrees, then the sensor module 11 at the front may need to have a first field of view of at least 285 degrees, while it may be sufficient that the one at the back has a first field of view of 255 degrees to cover 360 degrees around the vehicle body. In practice it is of course possible to use similar sensor modules (having 285 degrees field of view) in the back and in the front. However, the one in the back will still only be able to see 255 degrees around the vehicle corner as the rest of the field of view will be obstructed by the vehicle body. In other words, in some embodiments, the field of view of the sensor modules 11*a*, 11*b* may vary between 240 and 300 degrees or between 260 and 280 degrees. In any case, a sum of the field of views of the first and second sensor modules is at least 540 degrees.

Figure 3:
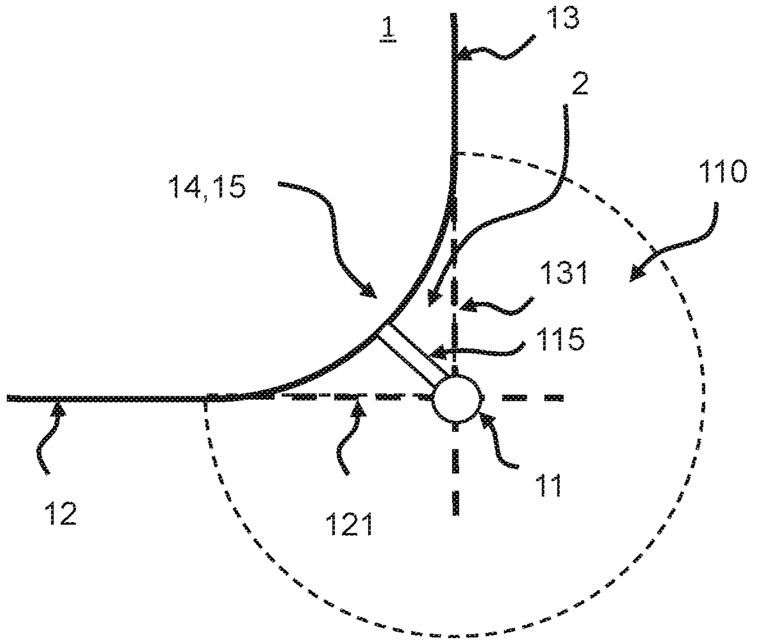
FIG. 3 illustrates a corner of the vehicle in FIG. 2 in more detail.

FIG. 3 illustrates an example corner 14, 15 of the vehicle in FIG. 2 in more detail. The corner could be either a front corner 14 or rear corner 15. A sensor module 11 is attached (or mounted) to the corner 14, 15 of the vehicle 1 using an attachment mechanism 115. In this example, the attachment mechanism 115 is arranged to position the sensor module 11 at least partly outside an occlusion zone 2 limited by extension lines 121, 131 (dashed lines) of the long sides 12 and the short sides 13. In this way free sight is obtained also around a rounded corner. In other words, in some embodiments, the attachment mechanism 115 is arranged to position the first and second sensor modules 11 such that they have free sight around a corner of the vehicle 1 at which the sensor module is mounted. In this example this means that the sensor modules 11 are arranged so far out from the vehicle that an unobstructed field of view 110 (illustrated by the dashed line) of at least 270 degrees of sensor coverage around the vehicle 1 can be obtained with one sensor module.

For a wider corner, the free-sight angle may be smaller, for example 250 degrees. Hence, in some embodiments, the attachment mechanism 115 is arranged to position the first and second sensor modules 11 such that each sensor module has a field of view of at least 250 degrees around the reference point (e.g. origin) of the vehicle.

In the example of FIG. 2, 360 degrees coverage around the vehicle 1 is obtained by two sensor modules 11*a*, 11*b*. However, for redundancy, more sensor modules 11*c* may be used. For example, sensor modules may be positioned at all four corners of the vehicle 1. The redundancy obtained by overlapping coverage can then be used to improve quality. It may also be used as a back-up in case one or more sensors of any type brakes. In other words, in some embodiments, the vehicle 1 comprises a third sensor module 11*c* which is the same kind as the first and second sensors 11*a*, 11*b* and mounted in the same way, but arranged at another corner of the vehicle 1 such that a field of view of the third sensor module 11*c* is overlapping the field of views of the first and second sensor modules 11*a*, 11*b*.

Figure 4A:
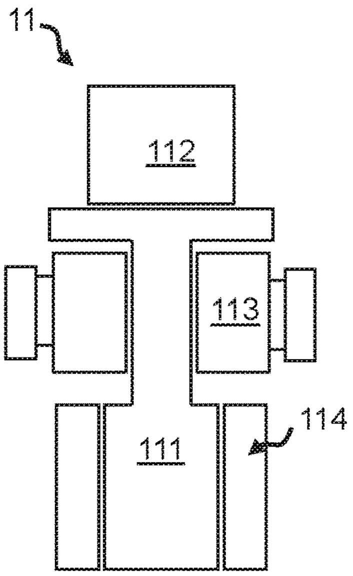
FIG. 4*a* illustrates a conceptual view of a sensor module.

FIG. 4*a* illustrates a conceptual view of a sensor module 11. More specifically, FIG. 4*a* illustrates an intersection of a sensor module 11. The sensor module 11 comprises a rigid structure 111, and two or more sensors of different types. Thus, the horizontal field of view 110 of the sensor module 11, referred to in FIG. 2, is composed by the horizontal field of views of the individual sensors of the sensor module.

More specifically, the proposed sensor module 11 comprises one or more first sensors 112 of a first sensor type, one or more second sensors 113 of a second sensor type and an attachment mechanism 115. A sensor type herein refers to sensors using a certain sensor technology, such as lidar, radar or image sensing.

In the illustrated example, the sensor modules 11 comprises additional sensors, more specifically one or more third sensors 114 of a third sensor type. The sensor types comprise for example one or more of image sensors, a radar and a lidar. Required cabling (not shown) of the sensors 112, 113, 114 can, where possible be shared between the different systems, especially for power supply and interfaces utilizing with bus type communication (i.e. CAN, ethernet). For example, the one or more first sensors 112 may share cabling with the one or more second 113 and/or third sensors 114.

The field of view 110 of the sensor module is obtained using the first and second sensors (and third sensors if present). In other words, the field of view of the sensor module 11 is composed by field of views of the individual sensors 112, 113, 114 of the module 11 as will be further explained below.

The rigid structure 111 (or rigid frame) is made of a rigid material such as aluminium or other metal with similar properties. The rigid structure 111 typically has a design that allows for good thermal and long-term characteristics, meaning that a relative calibration of the rigid structure and the sensors 112, 113, 114 will stay valid for a long time and cope well with external stress from vibration and shock. In some embodiments the rigid structure 111 is made in one piece, i.e. it is a homogenous body. The rigid structure 111 may be a symmetric body, which facilitates a large field of view. In the illustrated example, the rigid structure 111 is a homogenous body with a circular base and a t-shaped intersection. More specifically, the rigid structure 111 is a solid of revolution. In the illustrated example, the middle part of the rigid structure 111 is excavated in order to provide space for the second sensors 113.

Figure 4B:
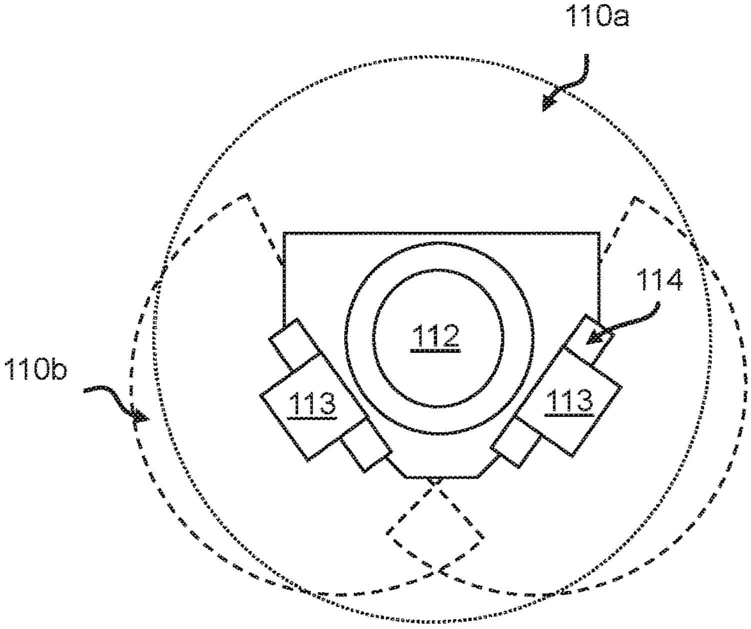
FIGS. 4*b*-*c* illustrate field of views of the sensor module of FIG. 4*a*.

The one or more first sensors 112 of a first sensor type are rigidly mounted at the rigid structure 111. The one or more first sensors 112 are rigidly mounted such that they provide a composed horizontal field of view around the sensor module 11. FIG. 4*b* illustrates the field of views of the individual sensor types of the sensor module 11. In the example of FIG. 4*a*, the first sensor 112 is illustrated as one single sensor having a large (360 degrees) field of view 110*a* (the dotted circle). For example, the first sensor 112 is a lidar having a cylindrical shape and a field of view 110*a* of 360 degrees in a horizontal plane around the first sensor 112. However, when the sensor module 11 is mounted at a corner of the vehicle 1 the field of view will be obstructed by the vehicle body. Hence, the perceived composed horizontal field of view of the first sensor in the example of FIG. 2 is still only 270 degrees.

The one or more second sensors 113 of a second sensor type are also rigidly mounted at the rigid structure 111. In the example of FIG. 4*a*, the second sensors 113 are illustrated as two sensors, more specifically two image sensors. In this example each image sensor has a field of view 110*b* of about 180 degrees (see FIG. 4*b*—dashed lines). The image sensors are arranged to have a total (or composed) field of view of about 270 degrees around the sensor module 11. The second field of view typically corresponds to at least a field of view which is unobstructed by the body of the vehicle 1, when the sensor module 11 is mounted at a corner of the vehicle 1. In the example of FIG. 2, this would be 270 degrees, but in other settings where the corners are not perpendicular a larger field of view may be required. Then one or more second sensors 113 may be added to the sensor module. In other words, the second sensors 113 provide a composed horizontal field of view around the sensor module.

Figure 4C:
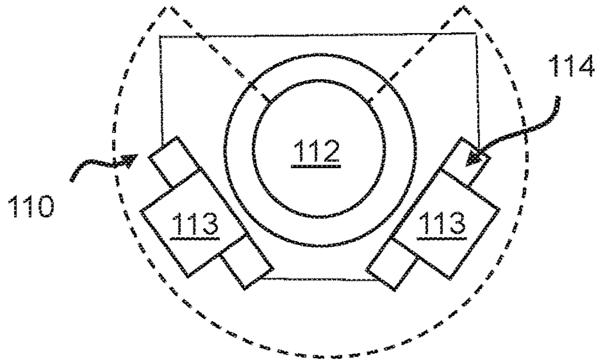

As can be seen in FIG. 4*b*, the horizontal field of view of the second sensors 113 overlaps with the horizontal field of view of the one or more first sensors 112. However, in this case the field of views of the first and second sensors 112, 113 are not exactly the same. In other words, they only overlap partly. The field of view 110 of the sensor module 11 may then be defined as an overlapping field of view covered by both sensor types. This overlapping field of view 110 is illustrated in FIG. 4*c*. In other words, the field of view 110 of each individual sensor module is in some embodiments an overlapping field of view covered by both the first composed horizontal field of view 110*a* and the second composed horizontal field of view 110*b*. Alternatively, the field of view of the sensor module 11 may be defined as the field of view covered by at least one (or at least two or more) of the sensor types. This may be relevant if a multitude of different sensor systems are implemented in one sensor module 11, as it may not be necessary that all sensor types cover the entire field of view of the sensor module. In principle, the field of view of the sensor module 11 may be defined in different ways.

In the illustrated example, the sensor modules 11 also comprise one or more third sensors 114 of a third sensor type. The third sensors 114 provide a third composed horizontal field of view around the sensor module 11. The total field of view of the third sensors 114 which overlaps with the horizontal field of view of the one or more first and second sensors 113. In the example of FIG. 4, the third sensors 114 are illustrated as two sensors, more specifically two radars. The radars have a total composed field of view of about 270 degrees (not shown). The field of view corresponds to at least a field of view which is unobstructed by the body of the vehicle 1, when the sensor module 11 is mounted at a corner of the vehicle 1.

The attachment mechanism 115 is a mechanism configured to attach the rigid structure 111 at the vehicle 1. The construction of the attachment mechanism may differ depending on the vehicle type. In some embodiments, the attachment mechanism 115 comprises a collapsible member arranged to position the sensor module 11 in a retracted position or in a protracted position.

The rigid structure 111 designed to hold the different sensor systems in close proximity. In practice, the closer the sensors are mounted, the less the sensors 11 may move in relation to each other. Hence, the distance between the sensors is in some embodiments in the range of millimetres or at least a few centimetres. In some embodiments, the distance between the first and second sensors within a sensor module is a fraction of a distance between two sensor modules.

This may be achieved in different ways, depending on the format and sizes of the individual sensor types. One way is to pile the sensors on top of each other. In other words, in some embodiments, the one or more first sensors 112 is mounted such that it is positioned at least partly on top of the one or more second sensors 113.

Figure 4D:
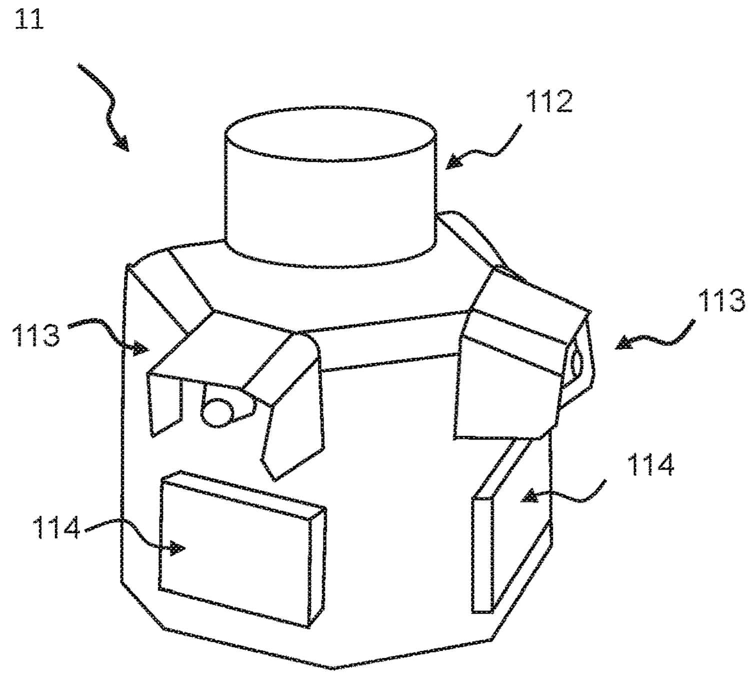
FIG. 4*d* illustrates a view of a sensor module according to some embodiments.

FIG. 4*d* illustrates a sensor module 11 according to some embodiments. In this example, the sensor module is cylindric with a tapered top. The different sensors 112, 113, 114 are piled on top of each other, such that they are arranged in close proximity. The tapered top consists of a lidar (first sensor 112). Below the lidar two image sensors (second sensors 113) are arranged, such that they have a total composed field of view of about 270 degrees. Below the image sensors, radars (third sensors 114) are arranged. In this embodiment, the sensors are, as in FIG. 4*a*, mounted to the rigid structure in a rotation symmetric manner in a horizontal plane. Hence, the field of view is the same to the left as to the right. With such a design, the sensor modules are symmetric and can be placed in any corner of the vehicle 1.

In the sensor module of FIG. 4*d* the sensors 112, 113, 114 of a sensor module 11 are positioned such that the viewing angles of the first, second and third sensors have a common viewing angle that originate from a common axis (i.e. the rotation centre of the lidar). In this way the pixels of the sensors will end up at the same place in the respective coordinate systems of the sensors. In this way the parallax (displacement of an object viewed from different positions) may be eliminated. It is typically desirable to place the sensors in this way, as it facilitates joint interpretation of sensor data from the different sensors.

Figure 5A:
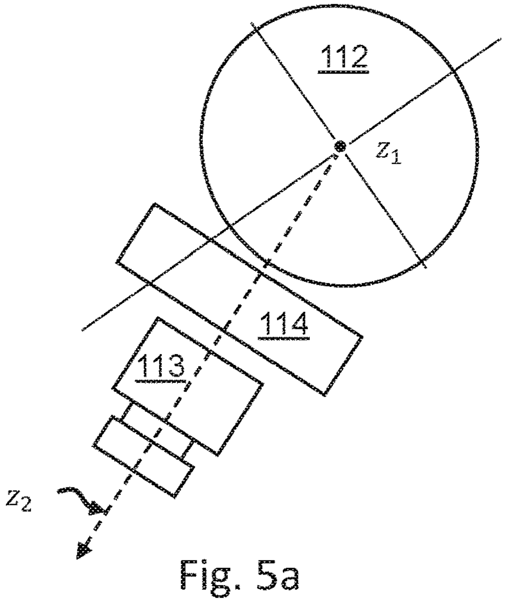
FIG. 5*a*-*c* illustrates sensors of different types that have a common viewing angle that originate from a common axis.

FIG. 5*a* conceptually illustrates a first sensor 112 (in this example the lidar), a second sensor 113 (in this example the image sensor) and a third sensor 114 (in this example the radar) that have the same viewing angle, here illustrated by the boresight of the image sensor (z-axis of the camera denoted $z_2$). The common viewing angle originates from a common axis $z_1$. With this sensor placement, the sensor data from the sensors 112, 113, 114 can be fused reliably for better target identification.

Figure 5B:
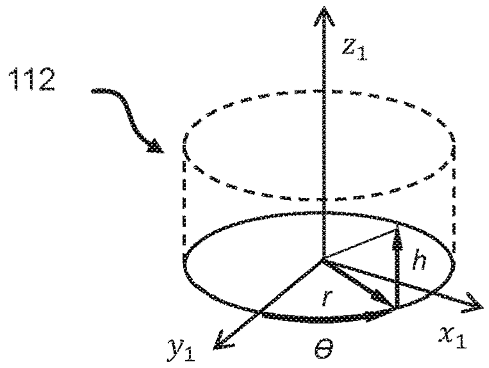
Figure 5C:
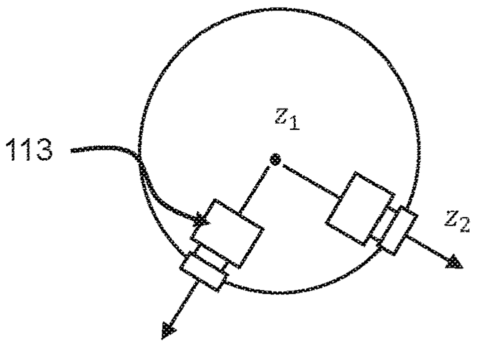

FIG. 5*b* illustrates a field of view of a lidar, and FIG. 5*c* illustrates the field of view seen from above. In these embodiments the first sensor 112 (in this example the lidar) has a cylindrical coordinate system ($x$, $y_1$, $z_1$, $\theta_1$, $r_1$, $h_1$) where the $z_1$-axis passes through the centre of rotation of the lidar, see FIG. 5*b*. The field-of-view is defined as an angle $\theta$, which is covered by the lidar. For an omnidirectional lidar the angle is 360 degrees. In these example embodiments, the second and third sensors 113, 114 are positioned such that the extension of their "sight point" (z-axis of camera denoted $z_2$) intersects the $z_1$-axis of the lidar, as illustrated in FIG. 5*c*.

For the second sensors 113 (image sensor) and the third sensors 114 (radar) this sensor placement implies that for each pair of second and third sensors (wherein two sensors placed on top of each other constitutes a pair) the optical axis (also referred to as the z-axis) are only displaced in height. More specifically, in this example each image sensor 113 has the same viewing angle as the radar 114 below. The z-axis (denoted $z_2$) is a line perpendicular to the plane containing the X and Y axis, which is conventionally defined as the plane facing the viewer. For example, for an image sensor the z-axis is the optical axis, i.e. a straight line that passes through the geometrical centre of a lens and joins the two centres of curvature of its surfaces. In some embodiments, the angle between two sensors of the same type is 90 degrees, which is an angle that simplifies transformation. It also makes the system more intuitive and therefore easier to calibrate. Note that the two sensors are typically mounted at different heights, but this can relatively easily be calibrated for.

In other words, some embodiments the one or more first sensors 112 are mounted such that the one or more first sensors 112 and the one or more second sensors 113 have a common viewing angle that originate from a common axis. In some embodiments the one or more third sensors 114 are also mounted such that they are also aligned (i.e. have a common viewing angle that originate from a common axis) with the one or more first and second sensors 112, 113.

When the sensor modules are manufactured, the sensors 112, 113, 114 are mounted at the rigid structure. It is typically desirable to do this with high accuracy. If the sensors are rigidly mounted at fixed predefined positions, such that their relative movement is negligible, then it may be calibrated as a unit after installation at the vehicle. In some embodiments, the one or more first sensors 112 and the one or more second sensors 113 are rigidly mounted at predefined positions at the rigid structure 111 with predefined accuracy.

For calibration, there are at least two options depending on the requirements. For normal calibration requirements the corner sensor module is only calibrated as a complete unit after vehicle installation. This can be done using any of the sensor systems on the module. Pre-calibration is then not needed as the sensor's positions are fixed and known from manufacturing.

For increased calibration requirements, the corner sensor module is pre-calibrated before vehicle installation, then additionally calibrated on the vehicle according to alt. 1.

It is also possible to provide the sensor modules with a cover. For example, a sheet of transparent glass or plastic could be wrapped around the sides of the cylinder-shaped sensor modules illustrated in FIG. 4*a* to 4*d*. The cover can then be mechanically cleaned by for example a wiper blade. In other words, in some embodiments, the at least two sensor modules comprise a transparent cover arranged to cover the field of views of the first and second sensors 112, 113.

The terminology used in the description of the embodiments as illustrated in the accompanying drawings is not intended to be limiting of the described method, control arrangement or computer program. Various changes, substitutions and/or alterations may be made, without departing from disclosure embodiments as defined by the appended claims.

The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims.

The invention claimed is:

1. A vehicle comprising a first sensor module and a second sensor module, each sensor module comprising:

a rigid structure, one or more first sensors of a first sensor type, wherein the one or more first sensors are rigidly mounted at the rigid structure such that they provide a first composed horizontal field of view around each of the first sensor module and the second sensor module, one or more second sensors of a second sensor type, wherein the one or more second sensors are rigidly mounted at the rigid structure such that they provide a second composed horizontal field of view around each of the first sensor module and the second sensor module, wherein a field of view of each of the first sensor module and the second sensor module is composed by the first composed horizontal field of view and the second composed horizontal field of view, an attachment mechanism configured to attach the rigid structure to the vehicle, wherein the first sensor module comprises a first attachment mechanism and the second sensor module comprises a second attachment mechanism;

wherein a sum of the fields of view of the first sensor module and the second sensor module is at least 540 degrees and wherein the first sensor module is arranged at a first front corner of the vehicle and wherein the second sensor module is arranged at a first rear corner at an opposite side of the vehicle such that the fields of view of the first sensor module and the second sensor module together cover 360 degrees in relation to a reference point at the vehicle;

wherein the vehicle comprises two long sides and two short sides and wherein the first attachment mechanism is arranged to position the first sensor module at least partly outside an occlusion zone limited by extension lines of the long sides and the short sides and wherein the first attachment mechanism is arranged to position the first sensor module such that the first sensor module has a free sight around the first front corner of the vehicle at which the first sensor module is mounted; and wherein the second attachment mechanism is arranged to position the second sensor module at least partly outside the occlusion zone, and wherein the second attachment mechanism of the second sensor module is arranged to position the second sensor module such that the second sensor module has a free sight around the first rear corner of the vehicle at which the second sensor module is mounted; and wherein the one or more first sensors is mounted such that the one or more first sensors and the one or more second sensors of the first sensor module have a common viewing angle that originate from a common axis of the first sensor module, wherein the one or more first sensors has a first viewing angle defining a first axis and the one or more second sensors has a second viewing angle defining a second axis such that the first axis and the second axis intersect at the common axis of the first sensor module from which the first viewing angle and the second viewing angle originate to eliminate parallax between the one or more first sensors and the one or more second sensors.

2. The vehicle of claim 1, wherein the field of view of the first sensor module is an overlapping field of view covered by both the first composed horizontal field of view and the second composed horizontal field of view.

3. The vehicle of claim 1, wherein for the first sensor module and the second sensor module, the fields of view are between 240 and 300 degrees or between 260 and 280 degrees.

4. The vehicle of claim 1, comprising a third sensor module, the third sensor module comprising a third sensor of the first sensor type and a fourth sensor of the second sensor type; and wherein the third sensor module is mounted at a third corner of the vehicle, wherein the third corner is a second front corner opposite the first front corner or a second rear corner opposite the first rear corner, and wherein a field of view of the third sensor module is overlapping the fields of view of the first sensor module and the second sensor module.

5. The vehicle according to claim 1, wherein the one or more first sensors and the one or more second sensors are rigidly mounted at predefined positions at the rigid structure with pre-defined accuracy.

6. The vehicle according to claim 1, wherein the one or more first sensors are mounted to the rigid structure in a rotation symmetric manner in a horizontal plane.

7. The vehicle according to claim 1, wherein a distance between the one of more first sensors and the one or more second sensors within the first sensor module or the second sensor module is a fraction of a distance between the first sensor module and the second sensor module.

8. The vehicle according to claim 1, where the first sensor module comprises a transparent cover arranged to cover the fields of view of the one or more first sensors and the one or more second sensors.

9. The vehicle according to claim 1, wherein the one or more first sensors is mounted such that the one or more first sensors is positioned at least partly on top of the one or more second sensors.

10. The vehicle according to claim 1, wherein the first sensor type and the second sensor type comprise one or more of image sensors, a radar and a lidar.

11. The vehicle according to claim 1, wherein the first attachment mechanism comprises a collapsible member arranged to position the first sensor module in a retracted position inside the occlusion zone or in a protracted position outside the occlusion zone.

12. The vehicle according to claim 1, further comprising a third sensor of a third sensor type rigidly mounted at the rigid structure of the first sensor module, wherein the third sensor has a third viewing angle defining a third axis such that the third viewing angle also originates from the common axis of the first sensor module.

13. The vehicle according to claim 1, wherein the first sensor type is a lidar sensor and the common axis passes through a center of rotation of the lidar sensor.

14. A sensor module for a vehicle comprising:

a rigid structure;

a first sensor of a first sensor type, wherein the first sensor is mounted to the rigid structure, wherein the first sensor has a first composed horizontal field of view around the sensor module;

a second sensor of a second sensor type, wherein the second sensor is mounted to the rigid structure, wherein the second sensor has a second composed horizontal field of view around the sensor module; and an attachment mechanism configured to attach the rigid structure to the vehicle;

wherein a field of view of the sensor module is composed by the first composed horizontal field of view and the second composed horizontal field of view; and wherein the first sensor and the second sensor have a common viewing angle that originate from a common axis of the sensor module, wherein the first sensor has a first viewing angle defining a first axis and the second sensor has a second viewing angle defining a second axis such that the first axis and the second axis intersect at the common axis of the sensor module from which the first viewing angle and the second viewing angle originate to eliminate parallax between the first sensor and the second sensor.

15. The sensor module according to claim 14, wherein the field of view of the sensor module is an overlapping field of view covered by both the first composed horizontal field of view and the second composed horizontal field of view.

16. The sensor module according to claim 14, wherein the first sensor type and the second sensor type comprise one or more of image sensors, a radar and a lidar.

17. The sensor module according to claim 14, further comprising a third sensor that is a third sensor type, wherein the third sensor has a third viewing angle defining a third axis such that the third viewing angle originates from the common axis; and wherein the first sensor type is a lidar sensor, the second sensor type is an image sensor, and the third sensor type is a radar sensor.

18. The sensor module according to claim 17, wherein the second sensor is mounted such that the first sensor is positioned at least partly on top of the third sensor.

19. The sensor module according to claim 17, wherein the second viewing angle and the third viewing angle are the same viewing angle.

20. The sensor module according to claim 17, further comprising a fourth sensor that is the second sensor type and a fifth sensor that is the third sensor type; and wherein the fourth sensor has a fourth viewing angle defining a fourth axis and the fifth sensor has a fifth viewing angle defining a fifth axis such that the fourth viewing angle and the fifth viewing angle originate at the common axis of the sensor module.

* * * * *